United States Patent

Besenhard et al.

[11] Patent Number: 5,916,708
[45] Date of Patent: Jun. 29, 1999

[54] FLUORINE-CONTAINING SOLVENTS FOR LITHIUM BATTERIES HAVING INCREASED SAFETY

[75] Inventors: Jürgen Otto Besenhard, Graz, Austria; Konrad Von Werner, Garching, Germany; Martin Winter, Neuseiersberg, Austria

[73] Assignee: Hoechst Aktiengesellschaft, Germany

[21] Appl. No.: 08/853,856

[22] Filed: May 9, 1997

[30] Foreign Application Priority Data

May 13, 1996 [DE] Germany .......................... 196 19 233

[51] Int. Cl.⁶ .................................................. H01M 10/40
[52] U.S. Cl. ............................................ 429/199; 429/335
[58] Field of Search ..................... 429/188, 197, 429/199, 335

[56] References Cited

U.S. PATENT DOCUMENTS

| | | | |
|---|---|---|---|
| 5,169,736 | 12/1992 | Bittihn et al. ............................ | 429/194 |
| 5,393,621 | 2/1995 | Chaloner-Gill .......................... | 429/192 |
| 5,529,859 | 6/1996 | Shu et al. ................................ | 429/194 |
| 5,633,099 | 5/1997 | Yokoyama et al. ..................... | 429/194 |
| 5,714,280 | 2/1998 | Nakano et al. .......................... | 429/197 |

FOREIGN PATENT DOCUMENTS

| | | | |
|---|---|---|---|
| 0631339 | 12/1994 | European Pat. Off. . | |
| 757 399 | 7/1996 | European Pat. Off. . | |
| 757399 | 2/1997 | European Pat. Off. ....... | H01M 10/40 |
| 7-249432 | 9/1995 | Japan . | |
| 8-97024 | 2/1996 | Japan .......................... | H01M 10/40 |

OTHER PUBLICATIONS

Database WPI, Section Ch, Derwent Publications Ltd., London GB; Class E16, AN 89–181258 1989, no month available.

Lichtenberger et al., "Sur les Additions Nucleophiles au Trifluorchlorethene (1)", Bulletin De La Societe Chimique De France, 1 Nr. 96, pp. 581–592 (1957) (no month available).

Besenhard, J. O., et al, "Inorganic film–forming electrolyte additives improving the cycling behaviour of metallic lithium electrodes and the self–discharge of carbon–lithium electrodes", *Journal of Power Sources* 44: p. 413 (1993). (no month available).

*Primary Examiner*—Maria Nuzzolillo
*Assistant Examiner*—Carol Chaney
*Attorney, Agent, or Firm*—Connolly & Hutz

[57] ABSTRACT

The safety of secondary lithium cells is remarkedly enhanced when partially fluorinated ethers of the formulae $$RO\text{—}[(CH_2)_mO]_n\text{—}CF_2\text{—}CFH\text{—}X \quad (I)$$

and/or $$X\text{—}CFH\text{—}CF_2O\text{—}[(CH_2)_mO]_n\text{—}CF_2\text{—}CFH\text{—}X \quad (II)$$

are being used, wherein R is a straight-chain alkyl group containing 1 to 10 carbon atoms or a branched alkyl group containing 3 to 10 carbon atoms, X is fluorine, chlorine or a perfluoroalkyl group containing 1 to 6 carbon atoms, which may also contain ethereal oxygen, m is an integer from 2 to 6 and n is an integer from 1 to 8. Preferred are compounds of the formula (I), wherein R is a methyl group, X is fluorine, m is 2 and n is an integer from 1 to 3 and also compounds of the formula (II), wherein m is 2 and n is an integer from 1 to 3.

10 Claims, 3 Drawing Sheets

Fig. 1: EC 1 M Imide
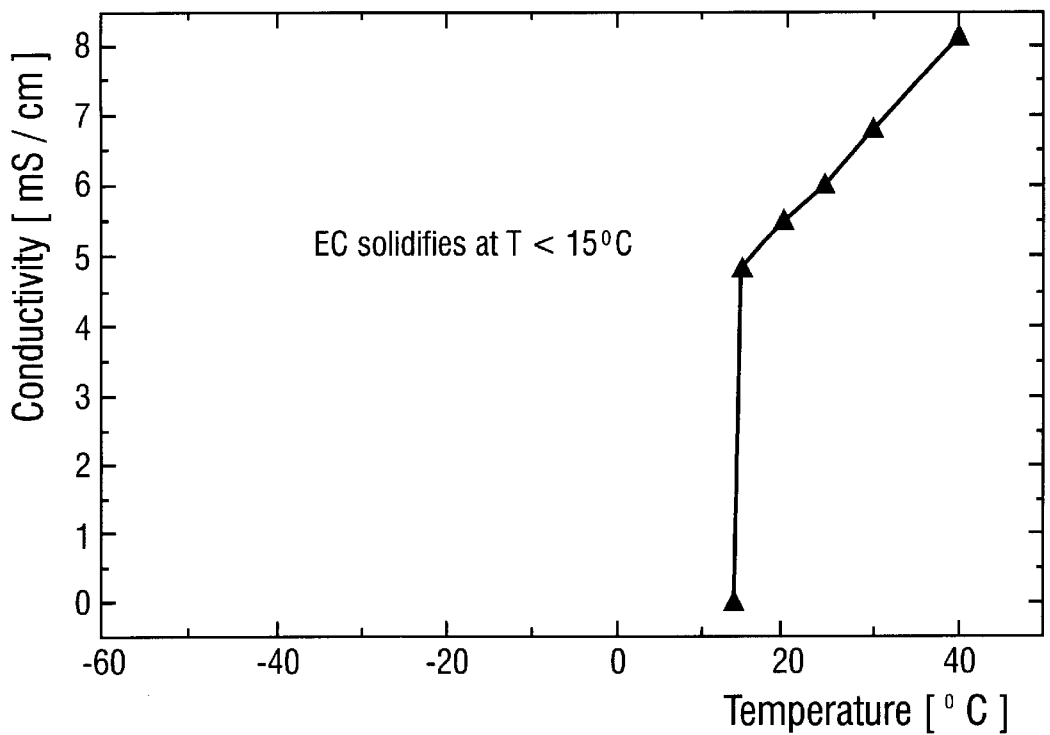
Fig. 2: EC / HC$_2$F$_4$O ( C$_2$H$_4$O ) C$_2$F$_4$H / PC 50/40/10 1 M Imide
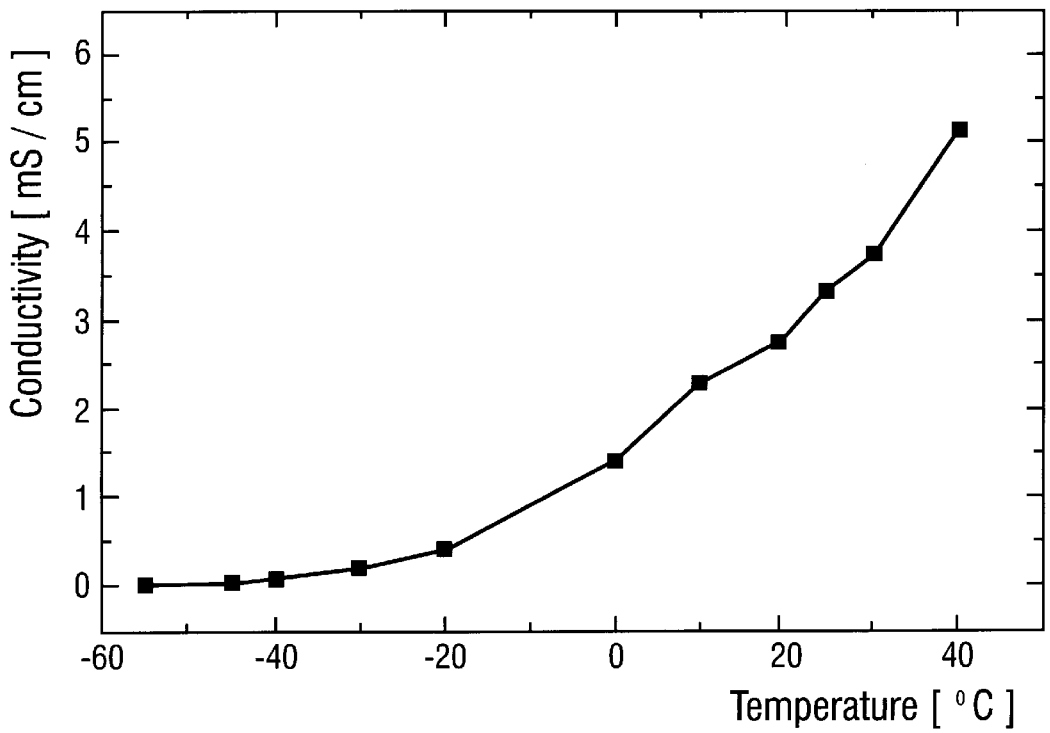

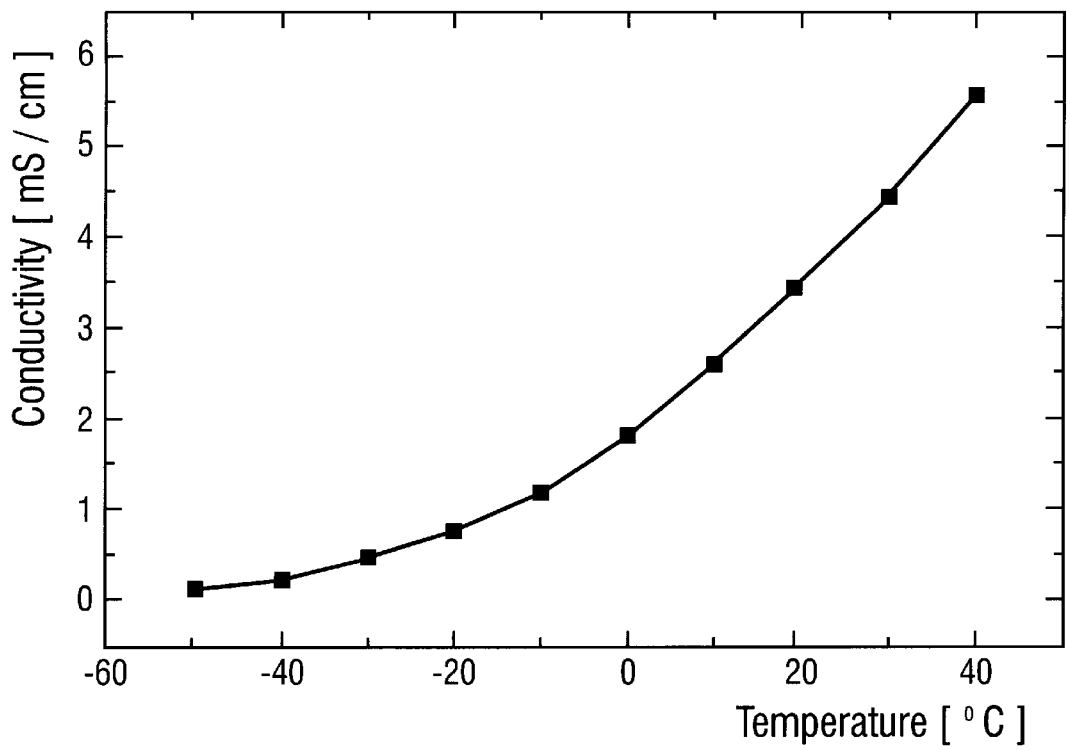
Fig. 3: PC / HC$_2$F$_4$O (C$_2$H$_4$O) C$_2$F$_4$H 70/30 1M Imide
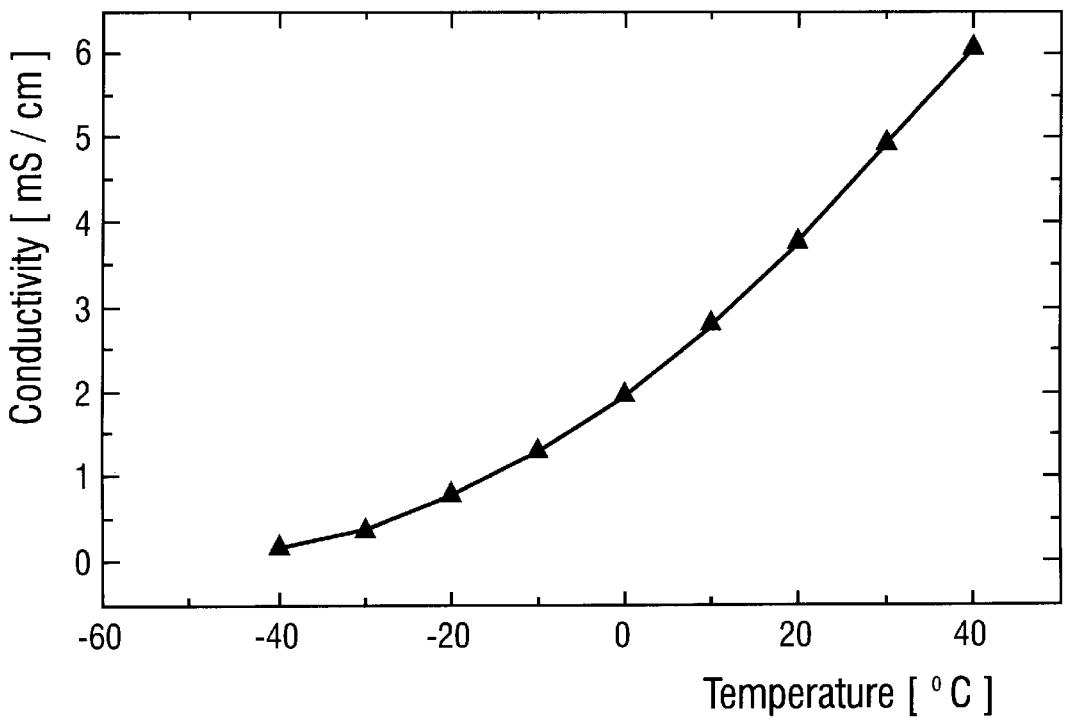
Fig. 4: PC 1 M Imide

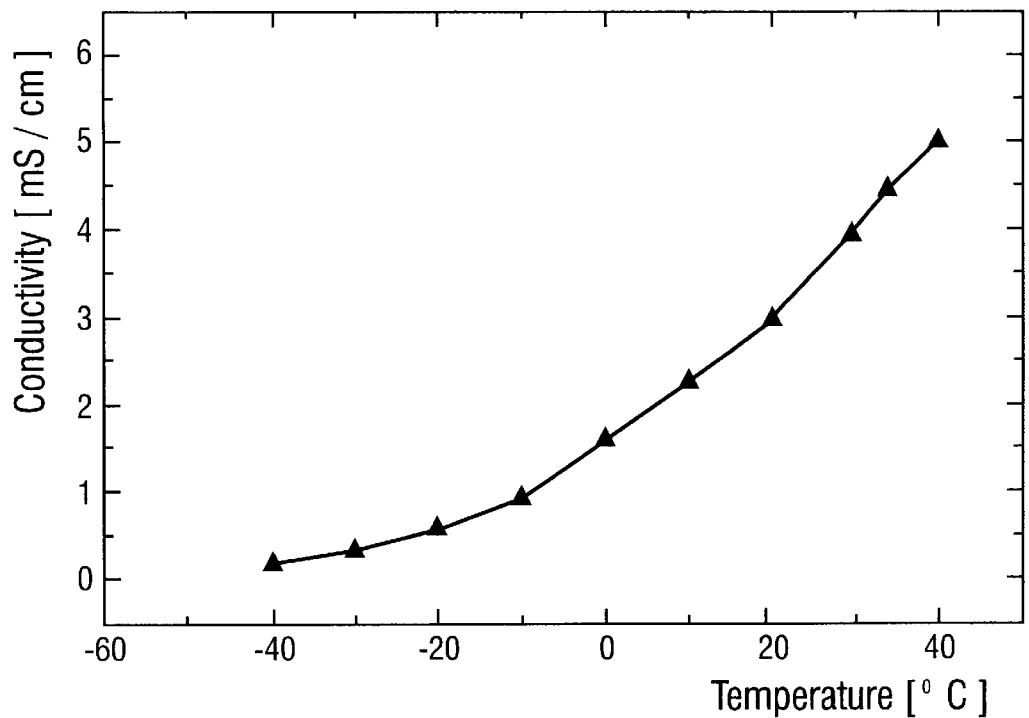
Fig. 5: PC / HC$_2$F$_4$O (C$_2$H$_4$O) C$_2$F$_4$H  70/30  1M LiPF$_6$
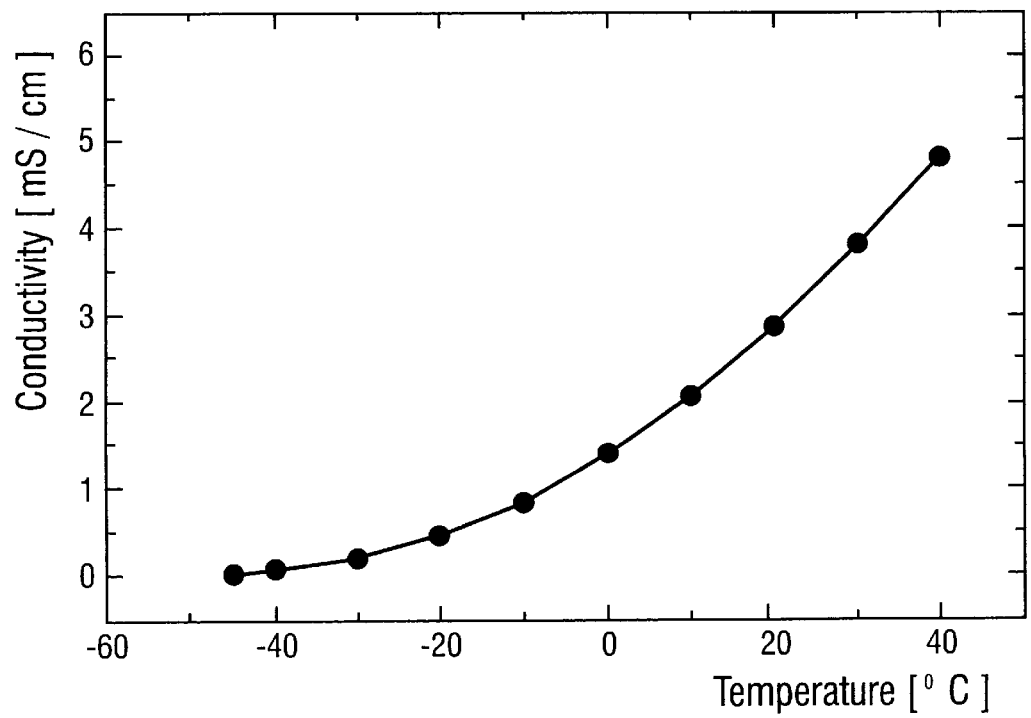
Fig. 6: PC / HC$_2$F$_4$O (C$_2$H$_4$O) C$_2$F$_4$H  30/70  1 M Imide

FLUORINE-CONTAINING SOLVENTS FOR LITHIUM BATTERIES HAVING INCREASED SAFETY

DESCRIPTION

In the context of environmental protection and of cost-effectiveness, development in the battery sector is clearly directed at rechargeable (secondary) batteries. In the important sector of mobile electronics (high-quality camcorders, portable computers, mobile telephones and the like), lithium ion batteries have great prospects because their energy density is roughly twice as high as that of the metal hydride cells and about three times higher than that of nickel/cadmium cells. A further interesting field is the use of secondary lithium ion batteries for electrotraction, for example for electrically driven town automobiles.

The main problem at present is the safety standard of rechargeable lithium batteries since critical operating states, such as overcharging, overdischarging or short circuit, which could certainly result in the opening of the cell and outbreak of fire, have hitherto often been avoided only by electronic monitoring.

According to the present prior art, use is made in secondary lithium batteries primarily of organic solvents containing heteroatoms with strongly polarizing action, such as, for example, nitrogen, oxygen or sulfur, for producing aprotic electrolyte solutions [see, for example, O. Popovych, R. P. T. Tomkins, Nonaqueous Solution Chemistry, John Wiley & Sons (1981) or G. J. Janz, R. P. T. Tomkins, Nonaqueous Electrolytes Handbook, Vol. I (1972), Vol. II (1973), Academic Press, New York]. Typical examples of such solvents are ethers (for example, 1,2-dimethoxyethane or tetrahydrofuran), esters (for example, propylene carbonate), nitriles (for example, acetonitrile), and also lactones, sulfones and many others.

Less flammable, or less inclined to the formation of explosive mixtures, are a few low-volatility, but unfortunately also highly viscous, solvents, such as propylene carbonate, ethylene carbonate or sulfolane (tetramethylene sulfone). Because of the high viscosity, the electrical conductivity of the electrolyte solutions prepared with these solvents is low, in particular at fairly low temperatures in addition, not only is the ion migration in such solutions slow, but so are all the other mass transport processes too.

To achieve high conductivities, use is generally made in engineering of solvent mixtures which contain at least one strongly polar component which, because of its polarity, has a strongly dissociating action on salts. A rough quantitative measure of the dissociation power is the permittivity. Since such highly polar solvents, such as, for example, propylene carbonate or ethylene carbonate, whose permittivities of 67 at 25° C. or 90 at 40° C. are approximately equal to that of water (78 at 25° C.), are also regularly rather highly viscous, use is generally made in addition of one or more low-viscosity components as "thinners". Typical thinners are, for example, 1,2-dimethoxyethane or dimethyl carbonate, which are characterized, however, by very low values of permittivity (approximately 7 for 1,2-dimethoxyethane and approximately 3 for dimethyl carbonate).

A serious disadvantage of the "thinner" components is their volatility and the ignition and explosion behavior associated therewith in the event of ingress of air. Since electrochemical applications of electrolyte solutions are always associated with heating as a result of current flow and, if faults occur (for example, short circuit inside or outside the electrochemical component) also with the risk of ignition, this disadvantage acquires a very considerable practical significance. The flashpoint for 1,2-dimethoxyethane, for example, is −6° C. and the explosive limit between 1.6 and 10.4% by volume.

The rechargeable lithium batteries generally contain a compound composed of lithium and a metal oxide as cathode (for example $Li_xMnO_2$ or $Li_xCoO_2$) and lithium metal as anode, the lithium preferably being used as intercalation compound with graphite or in combination with carbon or graphite fibers. A good survey of the development of such batteries is given by K. Brandt [Solid State Ionics 69 (1994), 173 to 183, Elsevier Science B.V.].

To increase safety, cathode space and anode space can be separated by a microporous separator diaphragm which is so designed that, if a defined limit temperature is exceeded, the current flow is automatically interrupted as a result of fusion sealing of the pores. Suitable diaphragms of this type are, for example, contained in the Celgard® range of the Hoechst Celanese Corporation. Furthermore, the safety of lithium batteries can be increased by pressure relief switches, which respond, for example, to gas development during overcharging, and very generally by complex monitoring and control electronics. Furthermore, flame-retarding phosphorous- and halogen-containing additives were also recommended.

All these measures cannot, however, eliminate the possibility that, in the event of the occurrence of faults the low-volatility components of the liquid electrolyte solutions nevertheless ultimately ignite and subsequently ignite, for example, the negative electrode. In this case, a fire results which can scarcely any longer be extinguished by normal means since, for example, burning lithium reacts violently not only with water, but also with the substances contained in standard fire extinguishers (for example carbon dioxide).

In earlier publications, perfluorinated ethers and perfluoroalkanes have already been proposed for the electrolyte system of lithium batteries (JP-A 7-249432 and EP-A 631 339). Although these are generally thermally and chemically very stable, they are poorly miscible with standard battery solvents. In addition, they generally have a poor solvent power for the conventional lithium conducting salts.

JP-A 7-249432 discloses the use of partially fluorinated ethers in electrolyte solutions for lithium secondary batteries. However, mentioned as being particularly preferred are ethers having a relatively low molar mass (for example 1,1,1,5,5,5-hexafluoro-3-oxapentane), which, according to experience, has the following disadvantages: high vapor pressure, low boiling point, poor solvent power for lithium conducting salts and, as a rule, also very low flashpoints. For example, the flashpoints of the compounds $ROCF_2CF_2H$ (R equal to methyl or ethyl) are below 10° C. and even the highly fluorinated ether of the formula $HCF_2CF_2CH_2OCF_2CF_2H$ has a flashpoint of only 22° C. Mixtures of dimethyl carbonate or ethyl carbonate with 3,3,4,4-tetrafluoro-2,4-dioxahexane having a 1M concentration of various lithium conducting salts were tested over three cycles in secondary lithium cells and found to be usable (M. Winter, Thesis Document, Technical University of Graz, "Filmbildung auf Lithium/Kohlenstoff-Intercalationsanoden" ["Film formation on lithium/carbon intercalation anodes"], September 1995).

According to the present prior art, reduced flammability of the electrolyte solution is achieved, in particular, by increasing the viscosity of the electrolyte solution by means of binders or fillers or by the use of polymeric electrolytes which are virtually solid at room temperature. U.S. Pat. No.

5 169 736 describes, for example, organic or inorganic thickening agents (polyethylene oxide, $SiO_2$, $Al_2O_3$ and others) in order to solidify liquid electrolyte solutions. Polymeric electrolytes based on macromolecules containing numerous polar groups, such as, for instance, polyethylene oxide [see, for example, B. Scrosati, editor, 2nd International Symposium on Polymer Electrolytes, Elsevier, London and New York (1990)] also have much lower flammability because of their low volatility. U.S. Pat. No. 5,393,621 describes polymeric electrolytes whose polar macromolecules are formed by polymerization of organophosphorous compounds, which are notable for particularly low flammability.

Common to all these gelatinous to solid electrolytes is the fact that, as a result of their high viscosity, the mobility of the ions of the salts dissolved in them is much lower than in liquid electrolyte solutions, with the result that, in particular at fairly low temperatures, the required conductivities are no longer achieved, at least for most technical applications. For this reason, alkali-metal batteries containing polymeric electrolytes, for example, have still not been able to achieve any economic significance despite decades of very intensive research activity.

The object of the present invention was to develop electrolyte solutions which are free of the abovementioned readily flammable and explosive low-viscosity "thinners" and consequently increase the safety of the electrolyte-containing devices, but nevertheless have viscosity and conductivity characteristics which make their practical use possible, even at low temperatures.

There was consequently an urgent need for stable solvents for lithium cells which are characterized by the following material properties:

1. High thermal stability.
2. High flashpoint.
3. Low vapor pressure or high boiling point.
4. Low viscosity.
5. Miscibility with standard battery solvents, for example ethylene carbonate, propylene carbonate or α,ω-dialkyl glycol ethers.
6. Adequate solubility for fluorine-containing lithium conducting salts, for example $LiPF_6$, $LiN(SO_2CF_3)_2$ or $LiC(SO_2CF_3)_3$.
7. High stability with respect to metallic lithium.
8. Good solvent power for carbon dioxide: $CO_2$ accelerates the buildup of protective films on lithium or $LiC_n$ anodes.

Surprisingly, it has now been found that certain groups of partially fluorinated aliphatic ethers satisfactorily to excellently fulfill the requirements mentioned under points 1 to 8. These are basically compounds which are characterized by the fact that they contain alkylene groups which are linked via ethereal oxygen to partially fluorinated alkyl groups, which may contain, in addition to fluorine, also hydrogen, chlorine and ethereal oxygen. Compounds in the context of this definition are ethers of the following formulae (I) and (II)

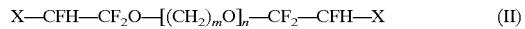

in which

R is a straight-chain alkyl group containing 1 to 10 carbon atoms or a branched alkyl group containing 3 to 10 carbon atoms, X is fluorine, chlorine or a perfluoroalkyl group containing 1 to 6 carbon atoms, which may also contain ethereal oxygen, m is an integer from 2 to 6 and n is an integer from 1 to 8, and

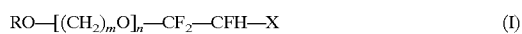

in which X, m and n have the abovementioned meanings.

The invention consequently relates to an electrolyte system for increasing the safety of lithium batteries which contains compounds of the formulae (I) and/or (II) in an active amount, the compounds with X as fluorine or trifluoromethyl being preferred. Particularly preferred are fluorine-containing ethers of the formula (I) in which R is a methyl group, X is fluorine, m is 2 and n is 1 to 3, and also ethers of the formula (II) in which X is fluorine, m is 2 and n is 1 to 3.

The compounds having m equal to 2 are generally preferred because they can be prepared from readily accessible and inexpensive ethylene glycol monoalkyl ethers or ethylene glycols. The compounds in which X is chlorine are less preferred because they may react at high temperatures with metallic lithium with the release of chlorine and fluorine to form the corresponding lithium halides.

The solution according to the invention to the safety problem of secondary lithium batteries is achieved by the use of compounds of the formulae (I) and/or (II) as essential component of the electrolyte system, use being made of their surprisingly low viscosity. The substances in accordance with the formulae (I) and (II) can be used as thinning agents for low-flammability, highly viscous components, for example ethylene carbonate and propylene carbonate. In this way, aprotic electrolyte systems can be produced which are virtually no longer flammable. The content of ethers of the formulae (I) and/or (II) is normally 5 to 70% by volume, preferably 20 to 50% by volume, relative to the total volume of the electrolyte system.

The partially fluorinated ethers in accordance with the formulae (I) and (II) also improve the solvent power for nonpolar or low-polarity gases, in particular $CO_2$, $N_2$, $N_2O$, $SF_6$, $SO_2FCl$ or $SO_2F_2$. Said gases can advantageously be used as protective gas in lithium batteries since they have a positive effect on the reactions proceeding at the negative electrode/electrolyte interface [see, for example, J. O. Besenhard, M. W. Wagner, M. Winter; J. Power Sources, 44 (1993), 413].

It is known that reactive contaminants (for example, water) have drastic adverse effects on the operation of lithium batteries even in very low concentrations. In practice, the sum of such contaminates should under no circumstances exceed 50 ppm. A big advantage of the products defined by the above formulae (I) and (II) is that they generally have such high boiling points that water and other reactive contaminants can easily be removed completely by distillation.

The viscosity of mixtures of ethers in accordance with the formulae (I) and (II) with propylene carbonate can be reduced by adding (at least) one low-viscosity, substantially fluorinated solvent selected from the group comprising the hydroperfluoroalkanes or hydroperfluoroethers in order to guarantee a high conductivity even at temperatures below 0° C. In such cases it is advisable to use conducting salts which dissociate particularly readily and which have large fluorine-containing anions, such as, for example, $LiN(SO_2CF_3)_2$ or $LiC(SO_2CF_3)_3$. The partially fluorinated ethers according to the invention act as phase intermediates in relation to the added, more highly fluorinated solvents. Particularly suitable agents for lowering the viscosity are, for example, 1H-perfluorohexane (kinematic viscosity at 20° C.: 0.55 mm$^2$/s, flashpoint >100° C.) and 2,3-dihydroperfluoro-5-methyl-pentane. These substances do not form explosive mixtures with air. This also applies to fluorinated ethers of the formula

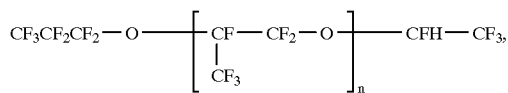

in which n is 1 or 2.

As is evident from Table 3, the compounds described by the formulae (I) and (II) have a tendency to thermal decomposition above 200° C. Surprisingly, it was found that the partially fluorinated ethers can be very effectively stabilized by very small amounts of tertiary aliphatic amines. Even small additions of the amine in the order of magnitude of 0.1 to 1.0% by weight relative to the partially fluorinated ether are sufficient to raise by 60 to 100° C. the temperature at which the ether begins to decompose. The tertiary amine should be high-boiling enough for it to remain predominantly in the liquid phase even at temperatures above 100° C. Suitable tertiary amines are, for example, tri-n-butylamine, tri-n-octylamine or 1,6-bis(dimethylamino) hexane. Aromatic amines are less suitable because of their tendency to anodic oxidation.

Our invention consequently relates also to a method for stabilizing compounds of the formulae (I) and (II) with tertiary aliphatic amines.

Synthesis of partially fluorinated ethers:

Primary alcohols react, when base-catalyzed, with diverse fluorine-containing alkenes to form partially fluorinated ethers [see Houben-Weyl, Methoden der Organischen Chemie [Methods of organic chemistry] 4th edition, Volume VI/3, (1965), 120/121, Georg Thieme Verlag, Stuttgart, and also the literature cited therein]:

ROH+F$_2$C=CFX→RO—CF$_2$—CFHX, in which R is a primary alkyl group and X is fluorine, chlorine or perfluoroalkyl (for example, CF$_3$).

The ethers shown in Table 1 containing 1H-tetrafluoroethyl groups were synthesized from the corresponding alcohols and tetrafluoroethylene (catalyst: KOH; solvent: N,N-dimethylformamide). The compound CH$_3$O(CH$_2$)$_2$OCF$_2$CFClH was obtained by the same method with chlorotrifluoroethylene (boiling point: 146 to 147° C., 1013 hPa; GC purity 99.4%).

In the reaction of alcohols with hexafluoropropene under basic conditions, partial HF release occurs, with the result that ethers of the formula RO—CF=CF—CF$_3$ (E/Z isomers) are formed as byproducts. This secondary reaction can be substantially suppressed by carrying out the reaction under high pressure [H. Kokelenberg and R. Pollet, Tenside Detergents 22 (1985), 1]. The compound CF$_3$CFHCF$_2$—O(CH$_2$CH$_2$O)$_2$—CF$_2$CFHCF$_3$ was prepared by this method (GC purity: 98.7%).

TABLE 1

Substance data for 1H-tetrafluoroethyl ethers based on glycol monoalkyl ethers and glycols

| Compound | GC purity [area %] | Density at 24° C. [g/ml] | Boiling point [° C./hPa] | DIN 51562 kinematic viscosity [mm$^2$/s] 20° C. | 50° C. | Flashpoint [° C.] | F content (calculated) [%] | Molar mass (calculated) [g/mol] |
|---|---|---|---|---|---|---|---|---|
| CH$_3$CCH$_2$CH$_2$OCF$_2$CF$_2$H | 99.4 | 1.25 | 117/970 | 1.12 | 0.68 | 33.5*) | 43.2 | 176 |
| CH$_3$CH$_2$OCH$_2$CH$_2$OCF$_2$CF$_2$H | 99.3 | 1.20 | 129/970 | 1.18 | 0.74 | 36.5*) | 40.0 | 190 |
| CH$_3$O(CH$_2$CH$_2$O)$_2$CF$_2$CF$_2$H | 99.8 | 1.24 | 84/22 | 2.71 | 1.35 | 78.0*) | 34.5 | 220 |
| CH$_3$O(CH$_2$CH$_2$O)$_3$CF$_2$CF$_2$H | 99.4 | 1.22 | 106–107/0.4 | 5.44 | 2.31 | 115.5**) | 28.8 | 264 |
| HCF$_2$CF$_2$OCH$_2$CH$_2$OCF$_2$CF$_2$H | 98.8 | 1.50 | 53/28 | 1.72 | 0.98 | 61.0*) | 68.0 | 262 |
| HCF$_2$CF$_2$O(CH$_2$CH$_2$O)$_2$CF$_2$CF$_2$H | 99.1 | 1.43 | 96/18 | 4.09 | 1.86 | 104.0**) | 49.7 | 306 |
| HCF$_2$CF$_2$O(CH$_2$CH$_2$O)$_3$CF$_2$CF$_2$H | 99.6 | 1.38 | 123/0.4 | 8.51 | 3.20 | 116.0**) | 43.4 | 350 |
| HCF$_2$CF$_2$O(CH$_2$CH$_2$O)$_n$CF$_2$CF$_2$H (n = 6.4) | — | 1.30 | — | 40.3 | 10.5 | 124.0**) | 30.4 | 500 (M$_w$) |

*)DIN 65680, accuracy ± 1° C.
**)DIN 51758, accuracy ± 1° C.

TABLE 2

Safety tests on partially fluorinated ethers

| Test substance | Ignition test with burning wooden spill | State after test | Stability to lithium*) |
|---|---|---|---|
| CH$_3$OCF$_2$CF$_2$OCH$_3$ | Burns, yellow flame | Glass incipiently etched | No reaction |
| CH$_3$OCH$_2$CH$_2$OCF$_2$CF$_2$H | Burns, yellow flame | Glass incipiently etched | No reaction |
| CH$_3$CH$_2$OCH$_2$CH$_2$OCF$_2$CF$_2$H | Burns, yellow flame | Glsss incipiently etched | No reaction |
| CH$_3$O(CH$_2$CH$_2$O)$_3$CF$_2$CF$_2$H | Not combustible | — | No reaction |
| HCF$_2$CF$_2$OCH$_2$CH$_2$OCF$_2$CF$_2$H | Not combustible | — | No reaction |
| HCF$_2$CF$_2$O(CH$_2$CH$_2$O)$_2$CF$_2$CF$_2$H | Not combustible | — | No reaction |
| HCF$_2$CF$_2$O(CH$_2$CH$_2$O)$_3$CF$_2$CF$_2$H | Not combustible | — | No reaction |

TABLE 2-continued

Safety tests on partially fluorinated ethers

| Test substance | Ignition test with burning wooden spill | State after test | Stability to lithium*) |
|---|---|---|---|
| $CF_3CFHCF_2O(CH_2CH_2C)_2CF_2CFHCF_3$ | Not combustible | — | No reaction |
| $CH_3OCH_2CH_2OCF_2CFClH$ | Burns, yellow flame | Glass incipiently etched | Vapor and smoke formation |

*)Test conditions:
An apparatus comprising a 20 ml quartz glass bulb with heatable dropping funnel mounted on top is carefully baked out in high vacuum using a hand-held high-power drier. After cooling and filling with argon, the bulb is charged with approximately 1 g of lithium, then the dropping funnel is charged with 5 ml of the test compound saturated with argon. The lithium is melted using a heating bath at 190° C. and the ether, preheated to approximately 100° C., is slowly added dropwise. Only the chlorine-containing ether reacts with lithium, LiCl and LiF being produced.

Thermoanalytical investigation of the stability of partially fluorinated ethers:

The thermal stability of typical partially fluorinated ethers was investigated by means of DSC (differential scanning calorimetry). The heating rate, starting at 20° C., was 10° C./min.

TABLE 3

| Substance | Start of decomposition [° C.] | Maximum [° C.] | Heat of reaction [kJ/mol] |
|---|---|---|---|
| $CH_3OCH_2CH_2OCF_2CF_2H$ | 208 | 226 | −67 |
| $CH_3CH_2OCH_2CH_2OCF_2CF_2H$ | 200 | 220 | −51 |
| $CH_3CH_2CCH_2CH_2OCF_2CF_2H$ + 1% $N(n-C_4H_9)_3$ | 282 | 295 | −49 |
| $HCF_2CF_2O(CH_2CH_2O)_nCF_2CF_2H$, ñ = 6.4 | 240 | 250 | −75 |
| $HCF_2CF_2O(CH_2CH_2O)_nCF_2CF_2H$ + 1% $N(n-C4H9)_3$, ñ = 6.4 | 300 | 315 | −70 |
| $CF_3CFHCF_2O(CH_2CH_2O)_2CF_2CFHCF_3$ | 210 | 222 | −73 |
| $CF_3CFHCF_2O(CH_2CH_2O)_2CF_2CFHCF_3$ + 1% $N(n-C_4H_9)_3$ | 290 | 303 | −70 |

Conclusions:

1. The thermal decomposition of the partially fluorinated ethers mentioned in Table 3 basically proceeds exothermically.
2. The partially fluorinated ethers can be efficiently stabilized by small amounts of a tertiary amine.

Conductivity measurements on electrolyte systems which contain an ether according to the invention:

BRIEF DESCRIPTION OF DRAWINGS

FIGS. 1 to 6 show the conductivity as a function of temperature in the range from +40 to approximately −50° C. For solvent mixtures, the proportions of the components are specified in percentage by volume. The lithium conducting salt was used in each case in 1M concentration.

Abbreviations:
EC: Ethylene carbonate
PC: Propylene carbonate
Imide: $Li^+[N(SO_2CF_3)_2]^-$ The invention is explained in still greater detail in the following examples.

Illustrative examples

To prepare the electrolyte, the solvent components used were first prepared as follows:

Ethylene carbonate (>99%, supplied by Merck) is distilled (boiling point 85 to 95° C.) in an oil-pump vacuum, dehydrated over activated molecular sieve (supplied by Roth, pore size 4 angstroms) at 150° C. for 3 days and stored at 60° C. under dried argon atmosphere [to remove traces of oxygen, 99.996% argon supplied by AGA was first passed over copper(I) oxide (supplied by BASF) reduced with argon W5 (mixture of 95 argon and 5% hydrogen, technical purity, supplied by AGA) and then dried over activated molecular sieve].

Propylene carbonate (pure, supplied by Aldrich) is distilled (boiling point 64 to 66° C.) in an oil pump vacuum via a 1.5 m long mirrored packed column and stored over activated molecular sieve under dried argon atmosphere at room temperature. After purification and drying, the residual water content of the solvent is determined by the Karl-Fischer method (for example, using the Mitsubishi CA 05 automatic titration unit). The water content should be below 10 ppm.

The fluorinated solvent component is dried for a few days over activated molecular sieve under dried argon atmosphere at room temperature.

The electrolyte solutions are prepared by the so-called Schlenk procedure in a dried stream of argon, the glassware used, which has a protective gas connection, being freed of adhering moisture before use in a colorless Bunsen burner flame with repeated alternation of argon flushing and oil pump vacuum suction.

EXAMPLE 1

Preparation of a safety battery electrolyte based on ethylene carbonate as film-forming component in lithium ion batteries.

40% by volume of monoglycol bis(tetrafluoroethyl) ether ($HC_2F_4OCH_2CH_2OC_2F_4H$) are added to 50% by volume of ethylene carbonate and 10% by volume of propylene carbonate. This solvent mixture is added while stirring to 287.1 g (1 mol) of lithium bis(trifluoromethane sulfone) imide [$LiN(CF_3SO_2)_2$, >99.5%, supplied by the 3M Company, dried for 4 days in high vacuum at 110° C.] and made up to 1 liter. The electrolyte prepared in this way is composed of 50% by volume ethylene carbonate, 40% by volume monoglycol bis(tetrafluoroethyl) ether (HC$_2$F$_4$OC$_2$H$_4$OC$_2$F$_4$H) and 10% by volume propylene carbonate and is 1M in terms of LiN(CF$_3$SO$_2$)$_2$. The electrolyte is notable for a very favorable low-temperature behavior down to −50° C. without the ethylene carbonate component crystallizing out, accompanied by good conductivity (FIG. 2), is stable in a wide "electrochemical window", behaves favorably in the intercalation of lithium in carbons and is extremely difficult to ignite. A solution of the imide in ethylene carbonate without addition of fluorinated ether is unsuitable for low temperatures (see FIG. 1).

EXAMPLE 2

Preparation of a safety battery electrolyte based on propylene carbonate containing lithium bis(trifluoromethane sulfone) imide [LiN(CF$_3$SO$_2$)$_2$] as conducting salt.

30% by volume of monoglycol bis(tetrafluoroethyl) ether (HC$_2$F$_4$OCH$_2$CH$_2$OC$_2$F$_4$H) are added to 70% by volume of propylene carbonate. This solvent mixture is added while stirring to 287.1 g (1 mol) of lithium bis(trifluoromethane sulfone)-imide [LiN(CF$_3$SO$_2$)$_2$, >99.5%, supplied by the 3M Company, dried for 4 days in high vacuum at 110° C.] and made up to 1 liter. The electrolyte prepared is composed of 70% by volume of propylene carbonate, 30% by volume of monoglycol bis(tetrafluoroethyl) ether (HC$_2$F$_4$OC$_2$H$_4$OC$_2$F$_4$H) and is 1M in terms of imide [LiN (CF$_3$SO$_2$)$_2$]. The electrolyte is notable for a favorable low-temperature behavior down to −50° C., accompanied by good conductivity (FIG. 3), is stable in a wide "electrochemical window", behaves favorably in the intercalation of lithium in carbons and is extremely difficult to ignite. The solvents are miscible with one another in any desired ratio [FIG. 4 shows the temperature dependence of the conductivity of an electrolyte which is composed of 30% by volume of propylene carbonate and 70% by volume of monoglycol bis(tetrafluoroethyl) ether (HC$_2$F$_4$OCH$_2$CH$_2$OC$_2$F$_4$H) and is 1M in terms of lithium bis(trifluoromethane sulfone) imide [LiN(CF$_3$SO$_2$)$_2$].

EXAMPLE 3

Preparation of a safety battery electrolyte based on propylene carbonate containing lithium hexafluorophosphate (LiPF$_6$) as conducting salt.

30% by volume of monoglycol bis(tetrafluoroethyl) ether (HC$_2$F$_4$OCH$_2$CH$_2$OC$_2$F$_4$H) are added to 70% by volume of propylene carbonate. This solvent mixture is added while stirring to 151.9 g (1 mol) of lithium hexafluorophosphate (LiPF$_6$, >99.9%, supplied by Merck or Hashimoto, can be used without prior drying) and made up to 1 liter. The electrolyte prepared is composed of 70% by volume of propylene carbonate and 30% by volume of monoglycol bis(tetrafluoroethyl) ether (HC$_2$F$_4$OC$_2$H$_4$OC$_2$F$_4$H) and is 1M in terms of lithium hexafluorophosphate. The electrolyte is notable for a favorable low-temperature behavior down to −50° C., accompanied by good conductivity (FIG. 5), is stable in a wide "electrochemical window", behaves favorably in the intercalation of lithium in carbons and is extremely difficult to ignite.

EXAMPLE 4

A 1M solution is prepared from 30% by volume of propylene carbonate and 70% by volume of monoglycol bis(tetrafluoroethyl) ether and the imide already mentioned. See FIG. 6 for conductivity measurement.

We claim:
1. An electrolyte which comprises at least one partially fluorinated ether chosen from the group consisting of formula (I)

in which
R is a straight-chain alkyl group containing 1 to 10 carbon atoms or a branched alkyl group containing 3 to 10 carbon atoms,
X is fluorine, chlorine or a perfluoroalkyl group containing 1 to 6 carbon atoms, which optionally contains ethereal oxygen,
m is an integer from 2 to 6 and
n is an integer from I to 8, formula (II)

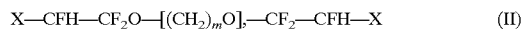

in which X, m and n have the abovementioned meanings and mixtures of formula I and formula II.
2. An electrolyte as claimed in claim 1, wherein X is fluorine or trifluoromethyl.
3. An electrolyte as claimed in claim 1, wherein, in formula (I), R is a methyl group, X is fluorine, m is 2 and n is 1 to 3 and, in formula (II), X is fluorine, m is 2 and n is 1 to 3.
4. An electrolyte as claimed in claim 1, wherein the content of partially fluorinated ethers is 5 to 70% by volume of the total electrolyte system.
5. The electrolyte as claimed in claim 4, wherein the content of partially fluorinated ethers is 20 to 50% by volume of the total electrolyte system.
6. An electrolyte as claimed in claim 1, which further comprises ethylene carbonate and/or propylene carbonate.
7. An electrolyte as claimed in claim 1, wherein, to stabilize ethers of the formulae (I) and (II), a tertiary aliphatic amine is used which has a boiling point of at least 100° C. at normal pressure and of which 0.1 to 1.0% by weight in relation to the fluorine-containing ether is used.
8. A secondary lithium battery having increased safety which comprises the electrolyte as claimed in claim 1.
9. The electrolyte as claimed in claim 1, which further comprises a fluorinated ether of the formula

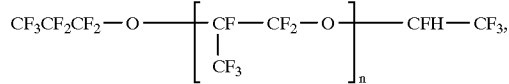

wherein n is 1 or 2.
10. An electrolyte which comprises at least one fluorinated ether of the form

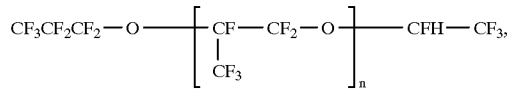

wherein n is 1 or 2.

* * * * *